(12) United States Patent
Kennedy et al.

(10) Patent No.: US 10,378,507 B2
(45) Date of Patent: Aug. 13, 2019

(54) FLUID FLOW INDUCED OSCILLATING ENERGY HARVESTER WITH VARIABLE DAMPING BASED UPON OSCILLATION AMPLITUDE

(71) Applicant: Renerge, Inc, Pittsburgh, PA (US)

(72) Inventors: Scott Kennedy, Durham, NC (US); Lisa Weiland, Pittsburgh, PA (US)

(73) Assignee: RENERGE, INC., Pittsburgh, PA (US)

( * ) Notice: Subject to any disclaimer, the term of this patent is extended or adjusted under 35 U.S.C. 154(b) by 22 days.

(21) Appl. No.: 15/352,997

(22) Filed: Nov. 16, 2016

(65) Prior Publication Data

US 2017/0234293 A1    Aug. 17, 2017

Related U.S. Application Data

(63) Continuation of application No. PCT/US2015/031331, filed on May 18, 2015.
(Continued)

(51) Int. Cl.
*F03B 13/10* (2006.01)
*F03B 17/06* (2006.01)
*H02K 35/02* (2006.01)

(52) U.S. Cl.
CPC .............. *F03B 17/06* (2013.01); *F03B 13/10* (2013.01); *H02K 35/02* (2013.01);
(Continued)

(58) Field of Classification Search
CPC .......... F03B 17/06; F03B 13/12; F03B 13/10; H02K 35/02; F05B 2220/707;
(Continued)

(56) References Cited

U.S. PATENT DOCUMENTS 2,341,679 A   2/1944  Wildermuth
4,024,409 A   5/1977  Payne
(Continued)

FOREIGN PATENT DOCUMENTS

DE   102008063340    7/2010
RU        02341679   12/2008
(Continued)

*Primary Examiner* — Charles Reid, Jr.
(74) *Attorney, Agent, or Firm* — Blynn L. Shideler; Krisanne Shideler; BLK Law Group (57) ABSTRACT

An energy harvester including a stand supporting the energy harvester in a fluid flow, i.e. a stream or current; at least one bluff body extending from the stand and positioned substantially perpendicular to the fluid flow, wherein each bluff body moves relative to the stand at least in a direction perpendicular to the fluid flow, wherein sufficient flow causes oscillating movement of the bluff body; and an electrical generator coupled to the stand and coupled to at least one bluff body converting the oscillating movement to electrical power, wherein the rate of electrical power generation per movement of the bluff body (or harvesting) is varied throughout a range of amplitudes of the oscillation of the bluff body and wherein the harvesting rate of at least one amplitude of the body oscillation is greater than the harvesting rate of at least one lower amplitude of the body oscillation.

4 Claims, 6 Drawing Sheets

Related U.S. Application Data (60) Provisional application No. 61/994,197, filed on May 16, 2014.

(52) U.S. Cl.
CPC ..... *F05B 2220/707* (2013.01); *F05B 2240/97* (2013.01); *F05B 2260/4031* (2013.01); *Y02E 10/22* (2013.01); *Y02E 10/28* (2013.01)

(58) Field of Classification Search
CPC ......... F05B 2240/97; F05B 2260/4031; Y02E 10/22; Y02E 10/28
USPC ............................ 290/54, 43, 42, 53, 20, 15
See application file for complete search history.

(56) References Cited

U.S. PATENT DOCUMENTS

| | | | |
|---|---|---|---|
| 4,184,805 A | 1/1980 | Arnold | |
| 4,347,036 A | 8/1982 | Arnold | |
| 4,476,397 A | 10/1984 | Lawson | |
| 4,754,157 A * | 6/1988 | Windle | F03B 13/189 290/42 |
| 5,324,169 A | 6/1994 | Brown et al. | |
| 5,548,956 A | 8/1996 | Price | |
| 6,020,653 A * | 2/2000 | Woodbridge | F03B 13/1865 290/42 |
| 6,153,944 A | 11/2000 | Clark | |
| 7,405,489 B2 * | 7/2008 | Leijon | F03B 13/189 290/42 |
| 7,493,759 B2 | 2/2009 | Bernitsas et al. | |
| 7,573,143 B2 | 8/2009 | Frayne | |
| 7,633,175 B1 | 12/2009 | Wilson, III et al. | |
| 7,696,634 B2 | 4/2010 | Filardo | |
| 7,821,144 B2 * | 10/2010 | Frayne | F03B 17/06 290/1 R |
| 7,839,007 B2 * | 11/2010 | Filardo | F03B 17/06 290/43 |
| 7,863,768 B2 * | 1/2011 | Filardo | F03B 17/06 290/43 |
| 7,874,882 B2 | 1/2011 | Sagov | |
| 7,884,490 B1 * | 2/2011 | Wilson, III | F01D 9/041 290/43 |
| 7,986,054 B2 | 7/2011 | Douglas | |
| 7,989,973 B2 | 8/2011 | Birkestrand | |
| 8,026,619 B2 * | 9/2011 | Frayne | F03B 17/06 290/1 R |
| 8,047,232 B2 | 11/2011 | Bernitsas | |
| 8,105,052 B1 * | 1/2012 | Hill, Jr. | F04B 17/00 417/331 |
| 8,142,154 B2 | 3/2012 | Gartner | |
| 8,288,883 B2 | 10/2012 | Finnigan | |
| 8,432,057 B2 | 4/2013 | Filardo | |
| 8,534,057 B1 | 9/2013 | Brown | |
| 8,604,634 B2 | 12/2013 | Pabon et al. | |
| 8,610,304 B2 | 12/2013 | Filardo | |
| 8,648,480 B1 | 2/2014 | Liu et al. | |
| 2005/0121915 A1 * | 6/2005 | Leijon | F03B 13/1885 290/42 |
| 2007/0176430 A1 | 8/2007 | Hammig | |
| 2008/0295509 A1 * | 12/2008 | Bernitsas | F03B 17/06 60/497 |
| 2009/0066087 A1 * | 3/2009 | Van Huffel | F03B 17/06 290/54 |
| 2009/0121489 A1 | 5/2009 | Kawai | |
| 2010/0084869 A1 * | 4/2010 | Leijon | F03B 13/1865 290/53 |
| 2011/0084489 A1 * | 4/2011 | Kaplan | F03B 17/06 290/54 |
| 2011/0193347 A1 * | 8/2011 | Leijon | F03B 13/1885 290/53 |
| 2011/0198850 A1 * | 8/2011 | Stromstedt | F03B 13/1815 290/53 |
| 2012/0104761 A1 * | 5/2012 | Vamvas | F03B 13/16 290/53 |
| 2013/0062889 A1 * | 3/2013 | Thoresen | F03B 13/12 290/1 R |
| 2013/0067904 A1 * | 3/2013 | Leijon | B63B 35/44 60/506 |
| 2013/0127167 A1 * | 5/2013 | Dore | H02K 35/02 290/53 |
| 2013/0127168 A1 * | 5/2013 | Dragic | F03B 13/1855 290/53 |
| 2013/0140824 A1 * | 6/2013 | Leijon | B66D 1/36 290/53 |
| 2016/0013703 A1 * | 1/2016 | Marzelius | F03D 5/00 290/43 |
| 2017/0234294 A1 * | 8/2017 | Kennedy | F03B 17/06 290/54 |

FOREIGN PATENT DOCUMENTS

| | | |
|---|---|---|
| WO | WO1981001867 | 7/1981 |
| WO | WO2006055583 | 5/2006 |
| WO | WO2008144938 | 12/2008 |
| WO | WO2011090453 | 7/2011 |
| WO | WO2015176057 | 11/2015 |

* cited by examiner

FLUID FLOW INDUCED OSCILLATING ENERGY HARVESTER WITH VARIABLE DAMPING BASED UPON OSCILLATION AMPLITUDE

RELATED APPLICATIONS

This application is a continuation of International Patent Application serial number PCT/US2015/031331 entitled "Fluid Flow Induced Oscillating Energy Harvester with Variable Damping Based upon Oscillation Amplitude" and which published Nov. 19, 2015 as WO2015-176,057, which publication is incorporated herein by reference. International Patent Application serial number PCT/US2015/031331 claims priority to U.S. Patent Application Ser. No. 61/994,197 filed May 16, 2014, entitled "Fluid Flow Induced Oscillating Energy Harvester with Variable Damping Based upon Oscillation Amplitude" which application is incorporated herein by reference in its entirety.

BACKGROUND INFORMATION

1. Field of the Invention

The present invention relates to fluid flow induced oscillating energy harvesters, particularly to maximizing power output in fluid flow induced oscillating energy harvesters.

2. Background Information

Energy harvesters converting ambient energy into electrical energy have attracted much interest in both the military and commercial sectors. For example, some energy harvesters convert motion of ocean waves into electricity to be used by oceanographic monitoring sensors for autonomous operation. Applications may include high power output devices (or arrays of such devices) deployed at remote locations to serve as reliable power stations for large systems. These energy harvesters generally must be sufficiently robust to endure long-term exposure to hostile environments and it is preferable if they have a broad range of dynamic sensitivity to exploit the entire spectrum of wave motions.

Energy harvesters in the form of conventional hydroelectric power generators usually comprise large rotating water turbines requiring extensive civil engineering works, and which require a large pressure head to be effective. This, in turn, often demands a high dam for creating the necessary potential energy. None of these large conventional hydroelectric power generators are suitable for operating in the shallow waters found in most rivers and tidal flows. As a result, hydroelectric water projects that utilize the entire river flow tend to be quite large thereby consuming large amounts of real estate and capital, while displacing whole populations of people, and disrupting the natural migration of fish and a cascading effect on the natural environment resulting in the wholesale disruption of the local environment.

There are many locations where a large mass of relatively shallow water flows in a constant and reliable manner under a relatively low pressure head, generally in areas of relatively flat terrain, which may not be suitable for efficiently driving a conventional water turbine. Often these locations are conveniently near large inland and some coastal cities, which are the major consumers of electric power. These locations include the fresh water currents in various rivers and streams throughout the world such as, for example, the Mississippi and Amazon Rivers, as well ocean currents such as Gulf Stream and the tidal currents in places like the Bay of Fundy.

Thus, there is a need for a fluid responsive energy harvester which can economically and safely extract useful power from relatively low head shallow waters and to use that power to perform useful work, such as the generation of electricity, nearer the point of consumption, thereby saving the environmentally degradation as well as the capitol expense and losses of power transmission systems.

Prior Art Review

The prior art has disclosed a number of fluid responsive energy harvesting methods, both theoretical and practical, for similar applications such as disclosed in U.S. Pat. No. 8,648,480. The '480 patent discloses an energy harvester configured to harness flow energy in a submerged platform having a support member located external to the housing and directly exposed to the fluid flow and lengthwise positioned in the direction of the fluid flow. The system provides for arraying a plurality of narrow diameter cantilevered cylinders to facilitate high frequency oscillations and tip displacements to drive the energy harvesters.

U.S. Pat. No. 8,610,304, and related U.S. Pat. Nos. 8,432,057 and 7,863,768 and 7,839,007 and 7,696,634, all disclose mechanisms for creating undulating motion, such as for propulsion, and for harnessing the energy of moving fluid. The mechanisms receive and transfer forces via transducers having one or more persistent deformations in changeable locations. Actuator or propulsion embodiments are powered by elastic or variable length transducers that exert forces on the deformed members which in turn exert forces onto ambient fluid such as air or water.

U.S. Pat. No. 8,604,634 discloses an energy harvester operating from flow-induced vibrations in which electrical energy is produced at a remote site by converting kinetic energy from fluid flow to electrical energy using a downhole energy harvester, also called a borehole energy harvester.

U.S. Pat. No. 8,534,057 discloses an energy harvester for a waterway with a plurality of blades fixed between wheels or linkages, wherein each blade "stabs" orthogonally into and out of the flow of water edge first, minimizing the displacement and disruption of the water upon entering.

U.S. Pat. No. 8,288,883 discloses an energy harvester for capturing energy from a fluid flow including a base and an oscillating member in the fluid flow pivotally connected relative to the base about a substantially vertical first pivotal axis.

U.S. Pat. No. 8,142,154 discloses an oscillating energy harvester in which two or more pivots are mounted onto a platform, and between these pivots, a flexible sheet of material is suspended in the fluid flow. The mechanism operates via oscillation of the pivots that result from the upwind or upstream pivot determining the side of the flexible sheet the low-pressure (lift) area favors.

U.S. Pat. No. 8,047,232 discloses an energy harvester designed to enhance vortex induced forces and motion through surface roughness control, whereby roughness is added to the surface of a bluff body in a relative motion with respect to a fluid.

U.S. Pat. No. 8,026,619, and related U.S. Pat. Nos. 7,821,144, and 7,573,143, all disclose an energy harvester utilizing fluid-induced oscillations in which the harvester includes a flexible membrane in the fluid flow having at least two fixed ends.

U.S. Pat. No. 7,989,973 discloses an energy harvester including a wing-shaped blade in the fluid flow in which a lift differential producing device in the blade produces a lift differential at the opposite sides of the blade and that device is switched so that one blade side or the other produces the greater lift for generating an oscillation in the moving blade.

U.S. Pat. No. 7,986,054 discloses an energy harvester capable of providing motion from fluid flow includes a magnus-rotor defined by a cylinder driven by a motor causing the cylinder to rotate so that lift is created by the fluid flowing past the cylinder.

U.S. Pat. Nos. 7,884,490 and 7,633,175 disclose an energy harvester with a resonating blade exposed to a fluid flow.

U.S. Pat. No. 7,493,759 discloses an energy harvester including at least one movable element immersed in a fluid medium and supported externally on a support structure such that the movable element can move relatively to the structure in response to a fluid motion by vortex induced motion, galloping or combination thereof, and at least one power device supported on the support structure and coupled to the movable element.

U.S. Pat. No. 6,153,944 discloses a fluid flow based energy harvester generating electricity from Aeolian oscillations caused by the flow of a fluid. An immobile beam extends between two piers, and a movable vane is disposed around the beam in parallel relation thereto.

U.S. Pat. No. 5,548,956 discloses an energy harvester having cable restrained reciprocating blades for energy extraction from moving body of water U.S. Pat. No. 5,324,169 discloses an oscillating, "lateral thrust" energy harvester for power production from low velocity fluid flow which includes a lateral support arm assembly extending from a vertical drive shaft. A power blade is pivotally secured to the distal end of the support arm, and constrained to pivot within a defined operating angle.

U.S. Pat. No. 4,476,397 discloses an energy harvester utilizing a sail and a mast pivotably mounted to a support configured to provide power from a relatively large volume of fluid moving at a relatively low speed.

U.S. Pat. Nos. 4,347,036 and 4,184,805 disclose an energy harvester implementing a "cascade" of thin airfoils. In one embodiment, the airfoils are provided with at least two degrees of freedom and adjacent airfoils are movable out of phase. The airfoils are subjected to the aerodynamically induced oscillations caused by the aero-elastic phenomenon known as flutter and the oscillatory movement is then harnessed to do useful work. In an alternate embodiment, the cascade of airfoils is mechanically oscillated within a moving fluid stream to increase the propulsion of the fluid. Where the fluid is a liquid, the cascade includes a plurality of hydrofoils.

U.S. Pat. No. 4,024,409 discloses an energy harvester which utilizes a member which oscillates in response to movement of a fluid past it and a means for utilizing the energy generated by the oscillation. In one embodiment the oscillating member is a cable utilizing wind or water as generator or pump. In a second embodiment, the oscillating member is an airfoil having either pitch control or active circulation control.

U.S. Patent Application Publication Number 2007-0176430 discloses a fluid powered energy harvester with an oscillating member in which the magnitude of the oscillations is controlled "by the degree of mechanical resonance between the oscillation rate of the fluidic thrusting and the structures resonance frequency."

U.S. Patent Application Publication Number 2009-0121489 discloses a fluid powered "flag type" energy harvester with a flexible pane oscillating member.

The parent application was published as WO2015-176,057, which is incorporated herein by reference. The searching authority indicated that additionally Russian Patent RU 2,341,679 from 2008; WO1981/001,867 from 1981; WO2011/090,453 from 2011; German Patent "102008063340" and WO2008/144,938 from 2008 were documents defining the general state of the art, although not considered of particular relevance to the current claims.

The above identified patents and published patent applications, which are incorporated herein by reference, are a representative sample of fluid responsive energy harvesting including fluid flow induced oscillating energy harvesters.

There is a need to simply and efficiently maximize energy harvesting in fluid flow induced oscillating energy harvesters. It is an object of the present invention to address this deficiency in the prior art fluid flow induces oscillating energy harvesters.

SUMMARY OF THE INVENTION

This invention is directed to cost effective, efficient, fluid flow induced oscillating energy harvesters that overcome at least some of the drawbacks of the existing designs by providing variable damping based upon oscillation amplitude. This invention provides a cost effective, efficient approach to maximizing power output in fluid flow induced oscillating energy harvesters.

One aspect of the present invention provides an energy harvester including a stand supporting the energy harvester and configured to support the energy harvester in a fluid flow, i.e. a stream or current; at least one bluff body extending from the stand configured to be positioned substantially perpendicular to the direction of fluid flow, wherein each bluff body is mounted for movement relative to the stand at least in a direction perpendicular to the direction of fluid flow, wherein sufficient fluid flow causes an oscillating movement of the bluff body relative to the stand; and an electrical generator coupled to at least one bluff body, wherein the electrical generator is configured to convert oscillating movement of the bluff body to electrical power, and wherein the electrical generator is configured such that the rate of electrical power generation per movement of the bluff body is varied throughout a range of amplitudes of the oscillation of the bluff body and wherein a rate of electrical power generation per movement of the bluff body of at least one amplitude of the oscillation of the bluff body is greater than a rate of electrical power generation per movement of the bluff body of at least one lower amplitude of the oscillation of the bluff body.

One embodiment of the invention provides a fluid flow induced oscillating energy harvester including a stand supporting the energy harvester and configured to support the energy harvester in a fluid flow; at least one bluff body extending from the stand configured to be positioned substantially perpendicular to the direction of fluid flow, wherein each bluff body is mounted for movement relative to the stand at least in a direction perpendicular to the direction of fluid flow, wherein sufficient fluid flow causes an oscillating movement of the bluff body relative to the stand; and an electrical generator coupled to at least one bluff body, wherein the electrical generator is configured to convert oscillating movement of the bluff body to electrical power, and wherein the electrical generator is configured such that a harvesting rate is defined as the electrical power generation per movement of the bluff body and wherein the harvesting rate is varied throughout a range of oscillation amplitudes and is lower at small amplitudes than greater amplitudes.

The fluid flow induced oscillating energy harvester according to the invention may be provided wherein the harvesting rate is varied through at least one of 1. varying a gap between magnets of the electrical generator and associated coils of the electrical generator;
2. varying the magnet density of the electrical generator at varying amplitudes of the bluff body oscillation;
3. varying the coil density of the electrical generator at varying amplitudes of the bluff body oscillation; and
4. the rate of rotation generated in the electrical generator per oscillation displacement is higher at a higher amplitude of the oscillation of the at least one bluff body than at a lower amplitude of the oscillation of the at least one bluff body.

These and other aspects of the present invention will be clarified in the description of the preferred embodiment of the present invention described below in connection with the attached figures in which like reference numerals represent like elements throughout.

BRIEF DESCRIPTION OF THE PREFERRED EMBODIMENTS

This invention is directed to a cost effective, efficient, fluid flow induced oscillating energy harvester 10 that maximizes power output and overcomes at least some of the drawbacks of the existing proposed designs. The up and down orientations in the figures is arbitrary. The harvester 10 may be supported in a fluid flow 16 extending vertically upwards generally as viewed in the figures or may be supported downward in the flow 16, such as being suspended from a barge or deck structure on the surface of a river.

Figure 1:
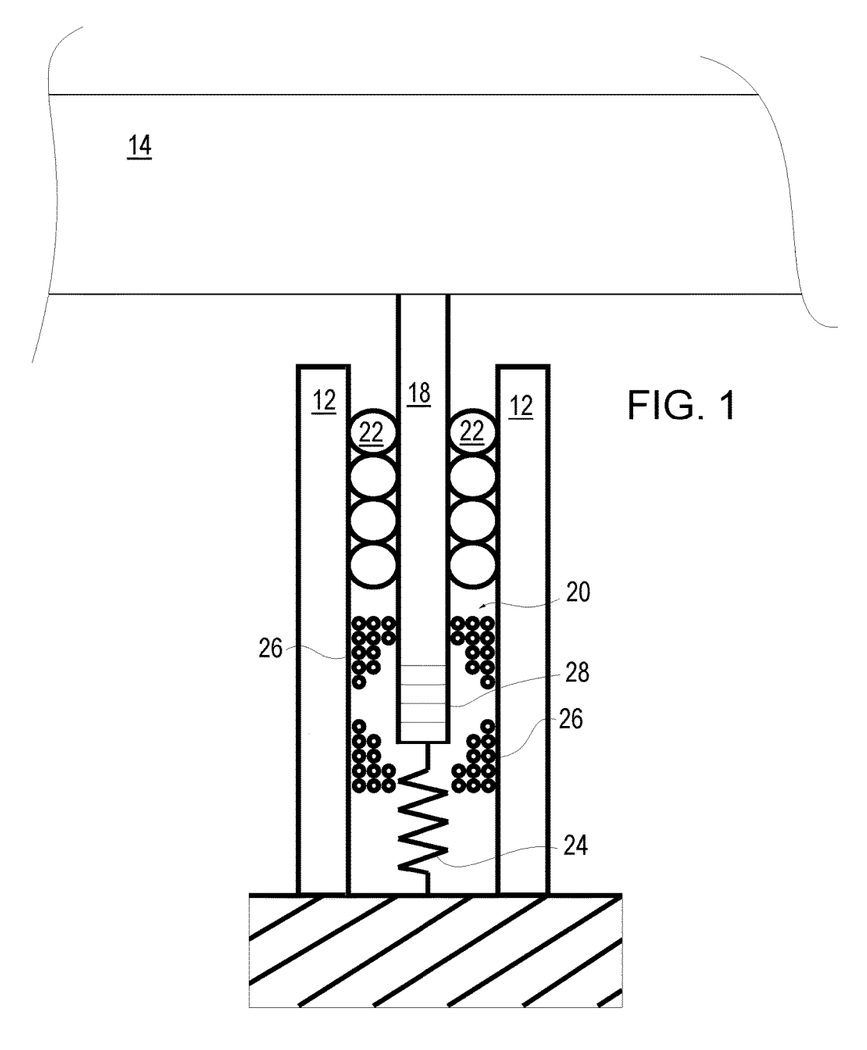
FIG. 1 is a schematic view of a fluid flow induced oscillating energy harvester with variable damping based upon oscillation amplitude according to the present invention.
Figure 2A:
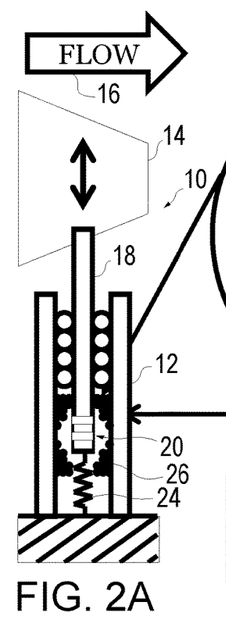
FIG. 2A is a schematic view of a fluid flow induced oscillating energy harvester with variable damping based upon oscillation amplitude according to one embodiment of the present invention.
Figure 7:
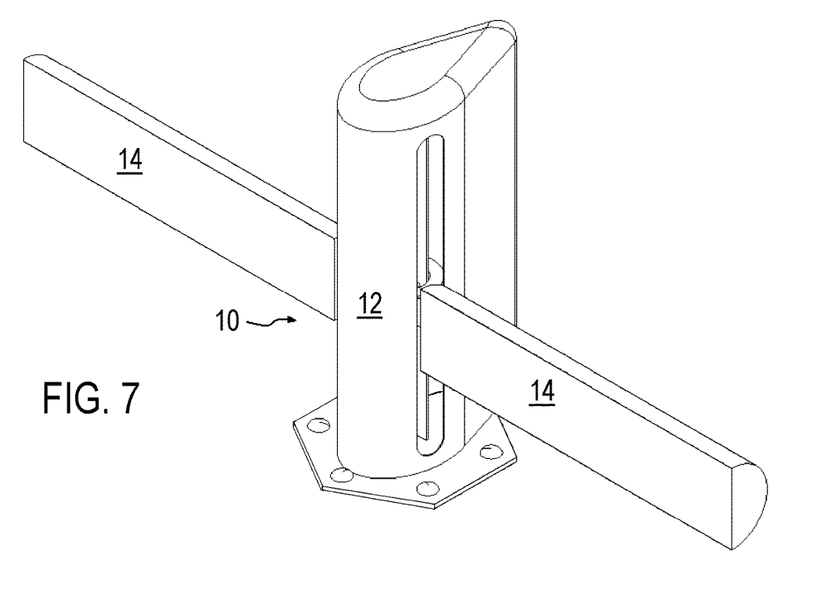
FIG. 7 is a perspective view of a fluid flow induced oscillating energy harvester formed according to the present invention.

One embodiment of the energy harvester 10 of the present invention is shown in FIGS. 1 and 2A and B and 7. The currently proposed oscillating energy harvester 10 includes a stand 12 supporting the oscillating energy harvester 10 in a fluid stream or current 16, such as a river bed. The stand 12 may also be called a base, a housing, a support and/or a piling. The construction of the stand 12, such as the shape shown in FIG. 7, is generally known in the art and need not be described in detail herein.

The stand 12 supports at least one, and generally a plurality of spaced bluff bodies 14. Each bluff body 14 may also be referenced as a prism or a beam. In the preferred embodiment each bluff body 14 is extending from the stand 12 in a cantilevered fashion as shown in FIG. 1 or 7. Further FIG. 7 shows a pair of bodies 14 extending from the side of the stand 12, which may be more common arrangement while the remaining figures suggest a placement of the bodies 14 above the stand 12 mainly to simplify the schematic illustration of the components of the harvester 10. Both arrangements are possible, as is suspending the bodies 14 below the stand 12 where the stand 12 is mounted above the primary flow 16, such as to a floating platform or barge and which surface location may represent a simpler easier location for the electrical generator and associated elements. Alternatively, each bluff body 14 may be supported between a pair of stands 12 at opposed ends thereof, however the cantilevered arrangement shown in FIGS. 1 and 7 is believed to be more economical. Each bluff body 14 is configured to be positioned substantially perpendicular to the direction of fluid flow (shown at 16). The particular construction of the bluff bodies 14 is believed to be known to those of ordinary skill in the art and the shape and surface of the bluff body 14 may be optimized for maximizing oscillation.

In the harvester 10, each bluff body 14 is mounted for movement relative to the stand 12 at least in a direction perpendicular to the direction of fluid flow 16. As shown each bluff body 14 is coupled to a support 18 which extends into the stand 12 to an electrical generator 20 within the stand 12. The support member 18 may take a number of forms and can include several elements, but can be generally described as the coupling between the moveable elements of the electrical generator 20 and the oscillating bluff bodies 14. The schematic figures form a representational image of the function of the support member 18. Conventional bearing, packing and sealing structures 22 can maintain and restrict the movement of the support 18 and associated bluff body 14 to a constrained oscillation motion. The details of constructing the support 18 and the bearing, packing and sealing structures 22 are generally known in the art. The form of the sealing structures 22 is dictated by the particulars of the support member 18.

Oscillation of the bluff body 14 is driven by fluid flow 16 past the bluff body 14, wherein sufficient fluid flow 16 causes an oscillating movement of the bluff body 14 relative to the stand 12. The oscillating support 18 and bluff body 14 is suspended or supported by a spring 24. The spring 24 establishes a zero-displacement or rest position. If there is no flow, the structure formed of support 18 portion of the electrical generator 20 coupled thereto and body 14 will rest at this position and when there is sufficient flow, the structure will oscillate about this rest position.

Harvesting electrical power in the harvester 10 damps the motion of the oscillating structure. At lower flow rates, it is possible to prevent oscillation if too much damping is imposed (i.e. if the rate of power generation per movement of the structure is too high), however, at higher flow rates, there is more energy available to harvest, so a higher rate of harvesting is desirable. Since the oscillation amplitude of the bluff body 14 varies with the flow rate 16, harvesting rates that varies with the flow rate 16 can be achieved in a simple, cost effective, passive design in the energy harvester 10 by varying the rate of harvesting with the position of the oscillating structure.

In other words, the electrical generator 20 is configured such that the rate of electrical power generation per movement of the bluff body 14 (i.e. the harvesting rate) is varied throughout a range of amplitudes of the oscillation of the bluff body 14 and wherein a rate of electrical power generation per movement of the bluff body 14 of at least one amplitude of the oscillation of the bluff body 14 is greater than a rate of electrical power generation per movement of the bluff body 14 of at least one lower amplitude of the oscillation of the bluff body 14.

Figure 2B:
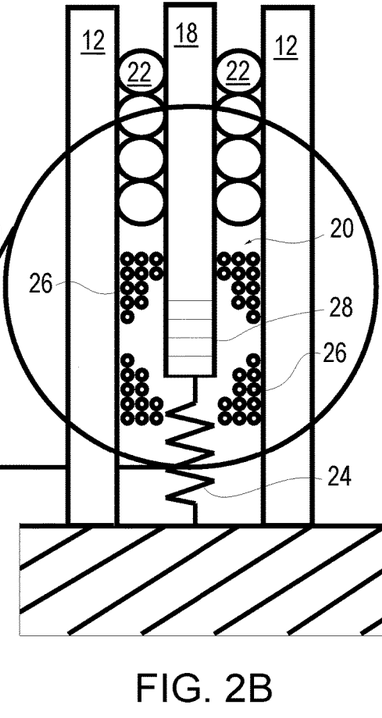
FIG. 2B is an enlarged schematic view of a stand and an electrical generator of the fluid flow induced oscillating energy harvester of FIG. 2A.

FIG. 2A is a schematic view of a fluid flow induced oscillating energy harvester 10 with variable damping based upon oscillation amplitude according to one embodiment of the present invention and FIG. 2B is an enlarged schematic view of a stand 12 and an electrical generator 20 of the fluid flow induced oscillating energy harvester 10 of FIG. 2A. In this embodiment of the invention the electrical generator 20 includes coils 26 mounted to the stand 12 and a magnet 28 (a plurality of magnets 28 may be implemented) coupled to the support 18 of the associated bluff body 14, wherein oscillation of the bluff body 14 will move the magnet 28 relative to the coils 26 to generate electricity in generator 20 in a manner generally known in the art.

The embodiment of FIGS. 2A and 2B the gap between coils 26 and magnet 28 varies with the amplitude of the oscillation of the body 14 in this linear generator. Near the zero-displacement or rest point, the gap would be large and for higher displacements the gap could be smaller. In other words the gap between the magnet 28 and an immediately adjacent coil 26 will vary with the amplitude of the oscillation of the at least one bluff body 14. The phrase "immediately adjacent coil 26" in this context will be the coils 26 that are the same vertical height/horizontal level of the magnet 28 (assuming the stand 12 is positioned vertically). With this configuration the gap between the magnet 28 and an immediately adjacent coil 26 is lower at a higher amplitude of the oscillation of the bluff body 14 than at a lower amplitudes of the oscillation of the at least one bluff body 14 as generally shown. The fluid flow induced oscillating energy harvester 10 as shown in FIGS. 2A and B may be provided such that there are no coils 26 immediately adjacent the magnet 28 with the bluff body 14 in the rest position.

It is possible to reverse the position of the coils 26 and the magnets 28 in the embodiment of FIGS. 2A and B such that one or more coils 26 are carried on the support 18 and a plurality of magnets 28 are coupled to the stand 12 and wherein the gap between the coil 26 mounted to the support 18 and an immediately adjacent magnet 28 mounted to the inside of the stand 12 will vary with the amplitude of the oscillation of the at least one bluff body 14. Specifically, the gap between the coil 26 mounted to the support 18 and an immediately adjacent magnet 28 mounted to the inside of the stand 12 is lower at a higher amplitude of the oscillation of the at least one bluff body 14 than at a lower amplitude of the oscillation of the at least one bluff body 14.

Figure 3:
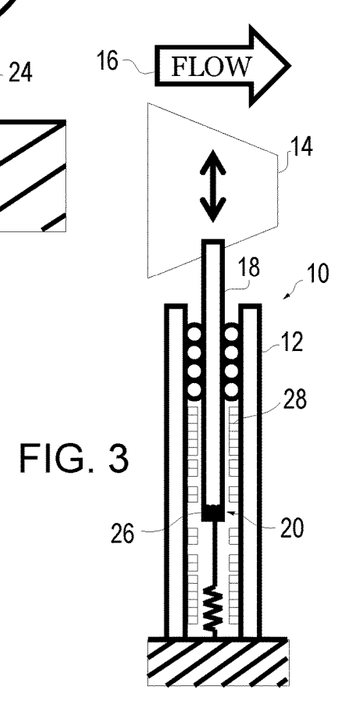
FIG. 3 is a schematic view of a fluid flow induced oscillating energy harvester with variable damping based upon oscillation amplitude according to another embodiment of the present invention.

FIG. 3 is a schematic view of a fluid flow induced oscillating energy harvester 10 with variable damping based upon oscillation amplitude according to another embodiment of the present invention. As with the described inverse of the embodiment of FIGS. 2A and B, this embodiment provides wherein the electrical generator 20 includes magnets 28 mounted to the inside of the stand 12 and at least one coil 26 coupled to the support 18 of the at least one bluff body 14, wherein oscillation of the at least one bluff body 14 will move the at least one coil 26 relative to the magnets 28 to generate electricity via generator 20. In this embodiment the gap between coil 26 and adjacent magnets 28 is constant. In this embodiment the distribution of the magnets 28, also called herein the density of the magnets 28, varies with height as shown here. No magnets 28 are placed near the zero displacement or rest point and the magnet density increases at higher amplitudes, as shown thereby increasing the harvesting rate at higher amplitudes.

As with the embodiment of FIGS. 2A and B, it is possible to reverse the respective position of the coils 26 and magnets 28 in the embodiment of FIG. 3 such that the coils 26 are coupled to the stand 12 and the magnet 28 is coupled to the support 18 and wherein the coil density of coils (via more coils 26 per length of stand 12) attached to the stand 12 in the vicinity of the magnet 28 will increase with the amplitude of the oscillation of the at least one bluff body 14.

Figure 4A:
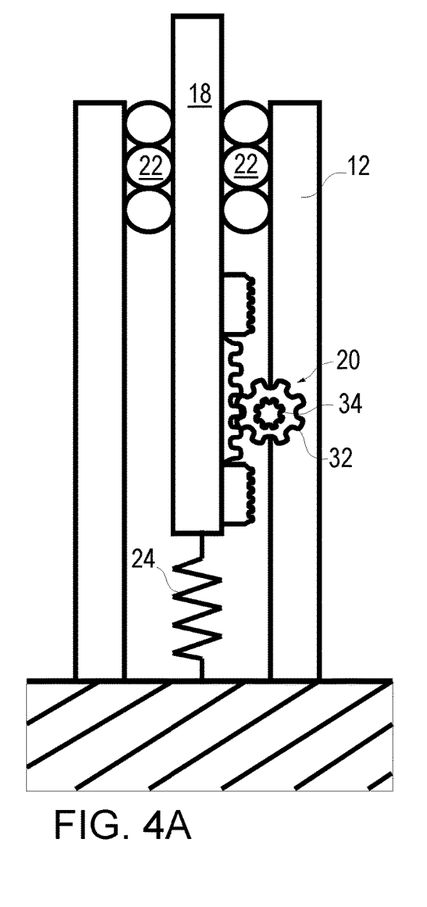
FIGS. 4A and B are schematic views of a stand and an electrical generator of a fluid flow induced oscillating energy harvester with variable damping based upon oscillation amplitude according to another embodiment of the present invention.
Figure 4B:
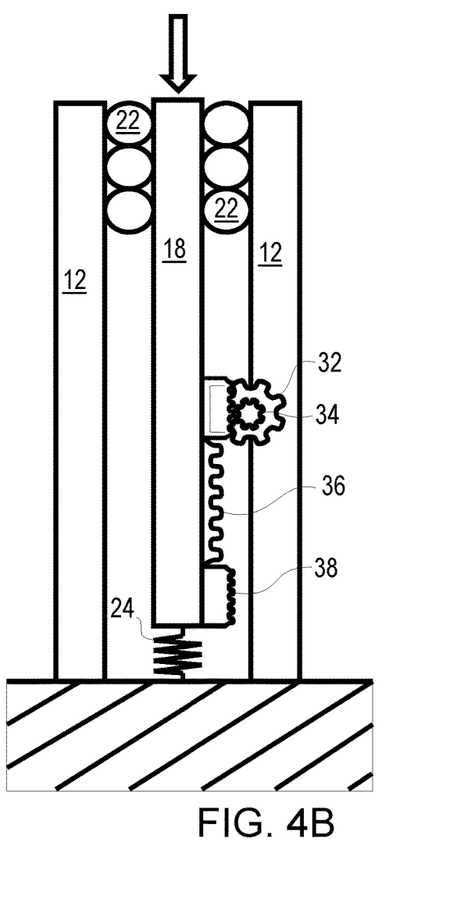

FIGS. 4A and B are schematic views of a stand 12 and a rotary electrical generator 20 (represented by dual pinions 32 and 34) of a fluid flow induced oscillating energy harvester 10 with variable damping based upon oscillation amplitude according to another embodiment of the present invention in which the electrical generator 20 converts oscillation of the at least one bluff body to rotation via pinions 32 and 34 which are coupled to a rotor of a rotor-stator (not shown) generator. The specifics of the rotary generator 20 are well known and need not be described in detail herein.

In the embodiment of FIGS. 4A and B, a dual rack 36 and 38 is attached to the support 18 of the oscillating structure and meshes with and drives respective pinions 32 and 34 that would in turn drive the rotary generator 20, for example. In this form, when the oscillation is near the zero-displacement or rest point, the rotary generator 20 would turn few revolutions per length of travel (via large pinion 32 and associated engaged rack 36) and relatively many revolutions per length of travel (via smaller pinion 34 and associated engaged rack 38) at higher displacements. In other words, the rack 36 engages the larger diameter pinion 32 to drive the generator near the zero-displacement position and at larger displacements, rack(s) 38 could engage smaller diameter pinion 34, achieving a higher generator rotation per length of oscillator movement. It should be apparent that more than two rates of harvesting may be provided and the schematic figures are merely for illustration.

Figures 5, 6A:
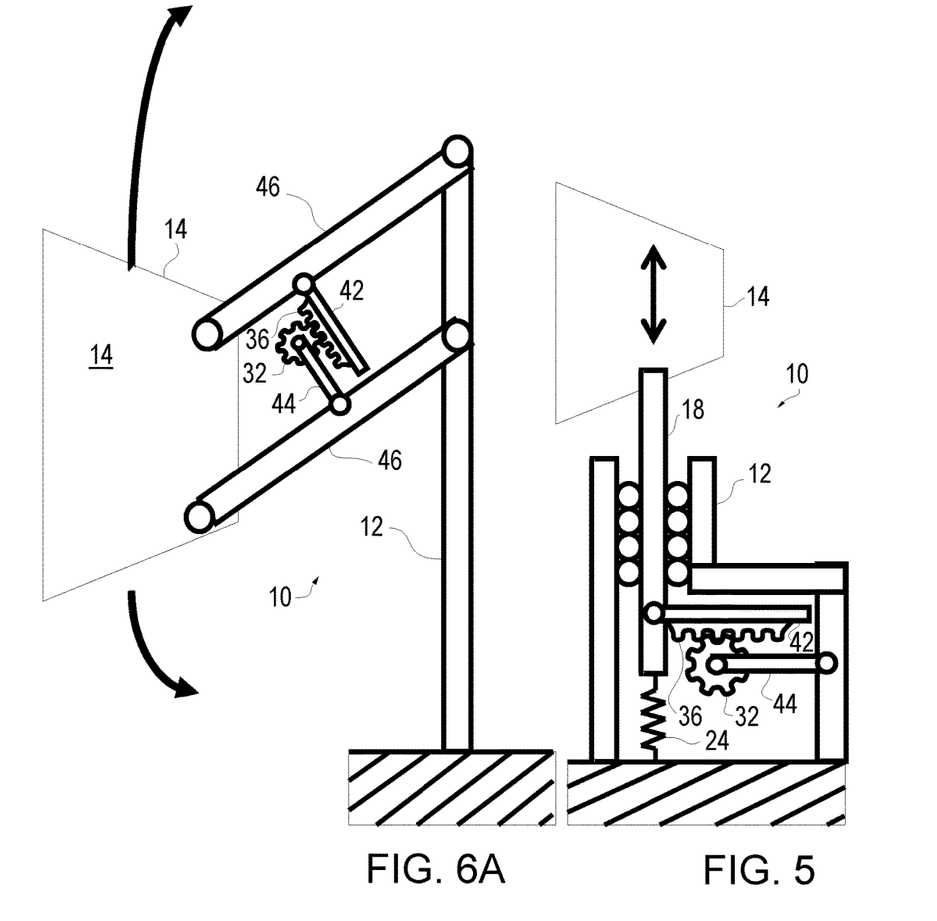
FIG. 5 is a schematic view of a fluid flow induced oscillating energy harvester with variable damping based upon oscillation amplitude according to another embodiment of the present invention.
FIGS. 6A-C are schematic views of alternative linkage arrangements fluid flow induced oscillating energy harvester with variable damping based upon oscillation amplitude according to further embodiments of the present invention.

It is apparent that many variations to the present invention may be made without departing from the spirit and scope of the invention. For example, FIG. 5 is a schematic view of a fluid flow induced oscillating energy harvester 10 with variable damping based upon oscillation amplitude according to another embodiment of the present invention in which a rack 36 is mounted to a linkage 42 coupled to the support 18 and meshes with a pinion 32 driving a rotary generator with the pinion 32 mounted on a separate linkage 44 coupled to the stand 12. The compound motion of the support 18 and the linkages 42 and 44 provides for the variable harvesting rate. Specifically as the amplitude of the motion of the body 14 increases the motion of the rack 36 relative to the pinion 32 increases thereby increasing the rotation rate of the pinion 32.

Figure 6B:
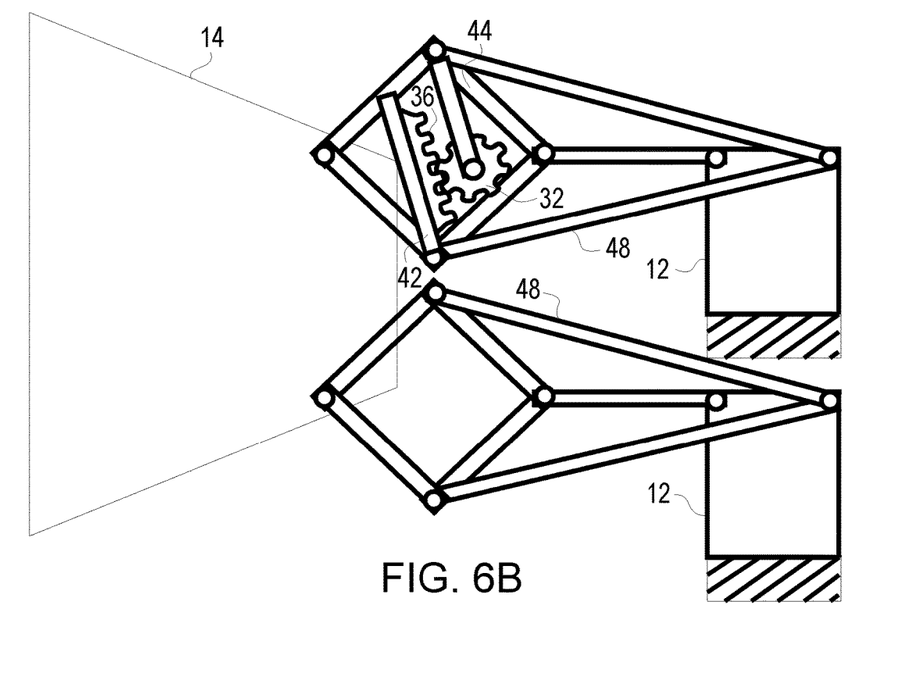

FIGS. 6A and B are schematic views of a fluid flow induced oscillating energy harvester 10 with variable damping based upon oscillation amplitude according to further embodiments of the present invention. In FIG. 6A the support 18 is replaced with a four bar linkage 46 and the rotary generator 20 is moved outside of the stand 12 to a position between the four bar linkage 46 as shown using the linkages 42 and 44 similar to FIG. 5. Analogous to FIG. 5 the compound motion of the four bar linkage 46 and the linkages 42 and 44 provides for the variable harvesting rate. Specifically as the amplitude of the motion of the body 14 increases the motion of the rack 36 relative to the pinion 32 increases thus increasing the rotation rate of the pinion 32. The spring 24 can be replaced with torsional springs to maintain the rest position of the body 14.

Figure 6C:
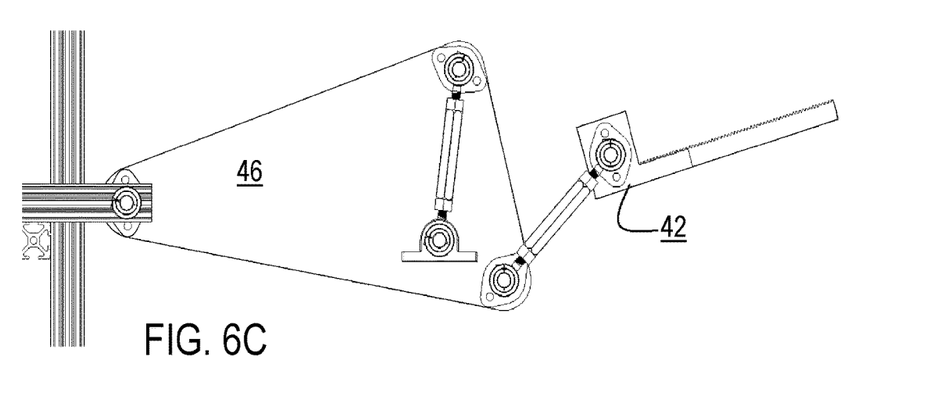

FIG. 6B is analogous to the embodiment of FIG. 6A except the four bar linkage 46 is replaced with a Peaucellier-Lipkin linkage 48, wherein the compound motion of the Peaucellier-Lipkin linkage 48, and the linkages 42 and 44 provides for the variable harvesting rate. Specifically as the amplitude of the motion of the body 14 increases the motion of the rack 36 relative to the pinion 32 increases thus increasing the rotation of the pinion 32. FIG. 6C shows an alternative harvester 10 linkage arrangements (with the generator removed for clarity) that may be more applicable for a suspended harvester 10 described herein and is merely illustrating further linkage possibilities.

It should be apparent that other alternatives are possible within the spirit and scope of the present invention. The present invention is defined by the appended claims and equivalents thereto.

What is claimed is:

1. A fluid flow induced oscillating energy harvester comprising:
a stand supporting the energy harvester and configured to support the energy harvester in a fluid flow;
at least one bluff body extending from the stand configured to be positioned substantially perpendicular to the direction of fluid flow, wherein each bluff body is mounted for movement relative to the stand at least in a direction perpendicular to the direction of fluid flow, wherein sufficient fluid flow causes an oscillating movement of the bluff body relative to the stand;
an electrical generator coupled to the at least one bluff body, wherein the electrical generator is configured to convert oscillating movement of the bluff body to electrical power, and wherein the electrical generator is configured such that a rate of electrical power generation per movement of the bluff body is varied throughout a range of amplitudes of the oscillation of the bluff body and wherein the rate of electrical power generation per movement of the bluff body of at least one amplitude of the oscillation of the bluff body is greater than the rate of electrical power generation per movement of the bluff body of at least one lower amplitude of the oscillation of the bluff body; and wherein the electrical generator converts oscillation of the at least one bluff body to rotation, and wherein the bluff body is extending from the stand in a cantilevered fashion.

2. The fluid flow induced oscillating energy harvester according to claim 1 wherein a rate of rotation per oscillation displacement is higher at a higher amplitude of the oscillation of the at least one bluff body than at a lower amplitude of the oscillation of the at least one bluff body and wherein the energy harvester is configured to be suspended within the fluid flow from a structure on the surface of a river.

3. A fluid flow induced oscillating energy harvester comprising:
a stand supporting the energy harvester and configured to support the energy harvester in a fluid flow;
at least one bluff body extending from the stand configured to be positioned substantially perpendicular to the direction of fluid flow, wherein each bluff body is mounted for movement relative to the stand at least in a direction perpendicular to the direction of fluid flow, wherein sufficient fluid flow causes an oscillating movement of the bluff body relative to the stand;
an electrical generator coupled to the stand and coupled to the at least one bluff body, wherein the electrical generator is configured to convert oscillating movement of the bluff body to electrical power, and wherein the electrical generator is configured such that a harvesting rate is defined as an electrical power generation per movement of the bluff body and wherein the harvesting rate is varied throughout a range of oscillation amplitudes and is lower at small amplitudes than greater amplitudes; and further including a spring supporting the at least one bluff body for oscillation about a rest position, and wherein each bluff body is extending from the stand in a cantilevered fashion.

4. The fluid flow induced oscillating energy harvester according to claim 3 wherein the harvesting rate is varied through at least one of i) varying a gap between a plurality of magnets of the electrical generator and associated coils of the electrical generator, ii) varying the magnet density of the electrical generator at varying amplitudes of the bluff body oscillation; iii) varying the coil density of the electrical generator at varying amplitudes of the bluff body oscillation; and iv) a rate of rotation generated in the electrical generator per oscillation displacement is higher at a higher amplitude of the oscillation of the at least one bluff body than at a lower amplitude of the oscillation of the at least one bluff body.

* * * * *